United States Patent [19]

Beinhauer et al.

[11] 4,005,478
[45] Jan. 25, 1977

[54] PROCESS AND ARRANGEMENT FOR REPRESENTING DIGITAL DATA BY BINARY SIGNALS

[75] Inventors: Manfred Beinhauer, Wolfratshausen; Eckhart Scharkowitz, Krailling, both of Germany

[73] Assignee: Siemens Aktiengesellschaft, Berlin & Munich, Germany

[22] Filed: July 23, 1975

[21] Appl. No.: 598,277

[30] Foreign Application Priority Data

Sept. 16, 1974 Germany .......................... 2444218

[52] U.S. Cl. .............................................. 360/40
[51] Int. Cl.² ......................................... G11B 5/00
[58] Field of Search ................. 360/39; 40, 41, 42, 360/43; 340/347 DD

[56] References Cited

UNITED STATES PATENTS

| | | | |
|---|---|---|---|
| 3,685,033 | 8/1972 | Srivastaua et al. | 360/40 |
| 3,757,309 | 9/1973 | Hashizume et al. | 360/40 |
| 3,921,210 | 11/1975 | Halpern | 360/40 |

*Primary Examiner*—Vincent P. Canney
*Attorney, Agent, or Firm*—Hill, Gross, Simpson, Van Santen, Steadman, Chiara & Simpson

[57] ABSTRACT

In a process for representing digital data by binary signals, in which the data are in the form of binary-coded, ternary-coded characters, or characters coded in a higher value code, the characters are fed in the form of data signals to a data transmitter which assigns binary signals to the characters. The binary signals are transmitted over a transmission channel to a data receiver which regains the digital data from the binary signals. The possible combinations of a given number of characters which form a group of characters are each assigned at least one combination of a plurality of signal elements, each of which represents a binary signal and forms a group of signal elements. The combination, in each case, contains first signal elements representing a first or a second amplitude value and/or second signal elements representing a change in the amplitude value. The assignment is carried out in such a manner that within each group of signal elements and with any arbitrary sequence of the groups of signal elements, always at least one plurality of first signal elements occurs between two second signal elements. The characters which are fed to the data transmitter are divided into groups of the given number, and the groups of characters are represented, in accordance with the assignment, by the groups of signal elements.

10 Claims, 12 Drawing Figures

PROCESS AND ARRANGEMENT FOR REPRESENTING DIGITAL DATA BY BINARY SIGNALS

BACKGROUND OF THE INVENTION

1. Field of the Invention

This invention relates to a process and apparatus for representing digital data by binary signals, in which the data are in the form of binary-coded, ternary-coded characters, or characters coded in a higher value code, and in which the characters are fed, in the form of data signals, to a data transmitter which assigns binary valves to the characters, and in which the binary signals are transmitted over a transmission channel to a data receiver which regains the digital data from the binary signals.

2. Description of the Prior Art

The recording processes preferably utilized for the storage of digital data are those processes in which the digital data are assigned rectangular binary signals which assume only two amplitude values. Each of these two amplitude values are assigned a code state, normally a saturation state of a storage medium, for example the magnetization states of a magnetic layer.

For the storage of data on the storage medium, a plurality of processes have already been provided for recording data in the form of binary signals. Known recording methods are, for example, the non-return to zero (mark) or NRZ (M) method and the phase encoding or phase modulation method. In the non-return to zero (M) method, only one of the two binary characters is represented by one single change in the code states. In the phase modulation method, each zone of a track assigned to a binary character, and known as a track element, is divided into two parts, each of which corresponds to one of the two code states. Each change in direction of the magnetization state is permanently assigned to one of the two binary characters. In this method, in the event of successive identical binary characters, additional changes occur at the boundaries of the track elements.

Another known recording method is disclosed in the U.S. Pat. No. 3,414,894, which is also known as "MFM" recording. In this method, the binary character 1 is represented by a change in the code state in the middle of a track element, and an additional change occurs at the boundary between two track elements having the binary character 0.

These known recording methods can also be utilized for the transmission of data. In this case, the amplitude values are assigned as code states, for example to the pluralities of the direct current. The known recording methods have the disadvantage, however, that the representation of each binary character requires at least one change in the code state of the storage medium, or of the transmitted quantity. If the storage density is defined as the number of binary characters which may be stored per unit of length, then the length unit is the smallest occurring interval between two changes, the maximum storage density which is obtained in the known methods is one bit per unit length. Consequently, the data transmission is subject to a maximum transmission speed of one bit per element duration, if the element duration is the smallest interval of time between two changes in the code states.

SUMMARY OF THE INVENTION

The primary object of the invention is to provide a process for the representation of digital data in which, while adhering to a given minimum permissible interval between two changes in the code state, the number of items of digital data which may be represented is increased.

According to the invention, the foregoing object is realized in a process of the type described above in that the possible combinations of a given number of characters which form a group of characters are each assigned at least one combination of a plurality of signal elements which forms a group of signal elements and represents a binary signal. Each group contains first signal elements representing a first or second amplitude value and/or second signal elements representing a change in amplitude value. The assignment is effected in such a manner that within each group of signal elements, and with any arbitrary sequence of the combinations of signal elements, always at least one group of first signal elements occurs between two second signal elements. The characters which are fed to the data transmitter are divided into groups of the given number and the groups of characters are represented by the groups of signal elements in accordance with the given assignment.

A process carried out according to the present invention has the advantage that the storage density and the transmission speed of the digital data is considerably increased in comparison to the known recording and transmission processes, while a given minimum interval is maintained between two changes in code states. In addition, the process has the advantage that for a number of applications the particular suitable recording or transmission process is determined by establishing the number of binary characters in a group, the number of signal elements in a group and the number of first signal elements between two second signal elements. The minimum number of first signal elements between two second signal elements is determined by the band width of the transmission channel with a given duration of the individual signal elements, and the minimum difference in the number of first signal elements between two second signal elements arranged at different distances is determined by the distortion of the transmission channel and the sensitivity of the data receiver.

If good pulsing of the binary signals is required, for example in the event of pulsing with an oscillator controlled or regulated by the binary signals, it is advantageous if the number of first signal elements between two second signal elements does not exceed a given number.

A particularly simple assignment of the groups of binary characters to the groups of signal elements is achieved if the assignment of the group of characters to a group of signal elements is independent of the adjacent groups of characters.

If there are insufficient suitable groups of signal elements available for an independent assignment of the groups, further groups of signal elements which cannot be used in the case of an independent assignment are used and a good pulsing of the binary signals is attained if the assignment of the group of characters to a group of signal elements is dependent upon the adjacent groups of characters.

A dependent assignment of the groups of binary characters to groups of signal elements is carried out in a particularly simple manner if the assignment of a group of characters to a group of signal elements is dependent upon the preceding groups of characters.

A circuit arrangement for the execution of the process in which, in the data transmitter, there is provided a converter which is supplied with the characters in the form of data signals and which emits the binary signals at its output, requires little expense if a converter is provided which comprises a first register into which a group of characters is input, a coder matrix which is connected to the outputs of the first register and which in each case assigns a group of signal elements, a second register designed as a shift register into which the binary values assigned to a group of signal elements are input, and a flip-flop which is connected to the ouput of the second register and at the output of which the binary signals are emitted.

If the assignment of a group of binary characters to a group of signal elements is dependent upon the particular preceding group of binary characters, the assignment to other groups of signal elements is achieved in a simple fashion if the first register is followed by a further register, and if the outputs of the registers are connected to a switching stage which checks the binary values of the signals at the outputs of the registers, and which feeds the coder matrix with a signal which changes the assignment of the groups of characters to groups of signal elements in dependence upon the content of the registers.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
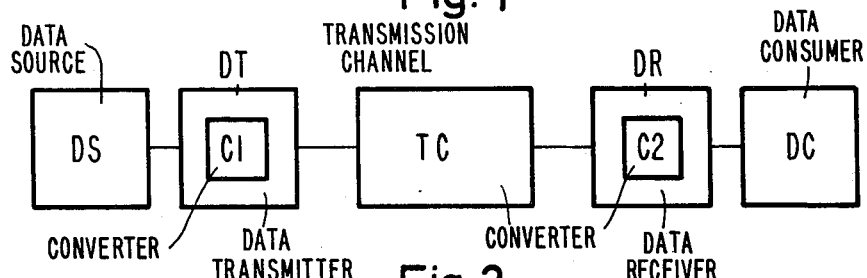
FIG. 1 is a block circuit diagram of an arrangement for the storage or transmission of data.

In the arrangement illustrated in FIG. 1 for the storage or transmission of digital data, a data source DS emits binary-coded data to a data transmitter DT. The data transmitter DT contains a converter C1 which converts the data into signals suitable for storage or transmission. These signals are conducted across a transmission channel TC to a data receiver DR. The data receiver DR contains a converter C2 which regains the binary-coded data from the received signals and feeds the data to a data consumer DC.

In this arrangement, the transmission channel TC is to be understood both as a transmission link via which the data are transmitted and as a store in which the items of data are stored. Such a store is, for example, a magnetic store in which the signals are assigned to the magnetizations of the magnetic surface which serves as a storage medium. In the following, the execution of the process will be described primarily for the case in which the items of data are stored. The same techniques, however, apply to the transmission data.

For example, the aforementioned non-return to zero (mark) NRZ (M) method, the phase modulation method, and the modified MFM method are used for assigning the binary-coded data to the course in relation to time, of the signals emitted from the data transmitter DS.

Figure 2:
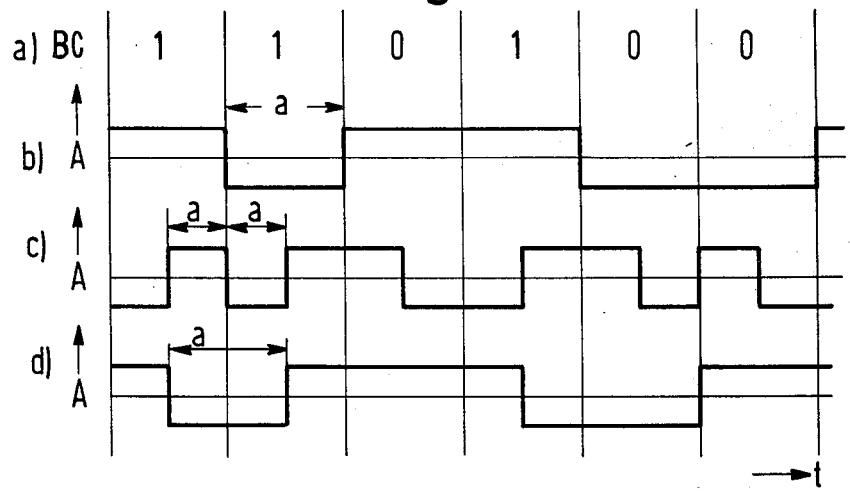
FIG. 2 is a timing diagram of signals which are assigned to a sequence of binary characters in accordance with various recording processes.

FIG. 2 represents binary signals such as are emitted at the output of the data transmitter DS in dependence upon the binary-coded data present at its input, if the recording method used is the MFM method, the phase modulation method and the NRZ (M) method. The time $t$ is plotted in the abscissa direction and the instantaneous values of the binary signals are plotted in the ordinate direction. When the data are stored on a storage medium, the time $t$ is assigned to a path on the storage medium. This path can be determined from the time $t$ when the speed of scanning of the storage medium is known.

In line $a$ of FIG. 2 a sequence of binary characters BC is illustrated which represent the binary-coded data emitted from the data source DS and which are present in the form of data signals at the input of the converter U1. The line $b$ in FIG. 2 represents the binary signals which are emitted at the output of the converter C1 when the NRZ (M) method is used. Each binary character 1 is assigned a change in amplitude of the binary signals. The smallest occurring interval of time between two changes is designated by the element duration $a$. In the case of data storage, this element duration $a$ corresponds to one unit length 1 on the storage medium. As at least one element duration $a$ is required for the representation of a binary character in these known recording methods, there is a transmission speed of one bit per element duration $a$, and a storage density of one bit, related to the length unit 1 assigned to the element duration $a$.

The line c represents the binary signals such as are emitted at the output of the converter C1 if the phase modulation method is used. Each binary character 1 is assigned a change in the amplitude of the binary signals in the positive direction and each binary character 0 is assigned a change in the negative direction. Consequently, between the changes, additional changes occur at the boundaries of the zones assigned to the binary characters. The representation of one binary character requires two element durations $a$ and this results in a storage density of 0.5 bits per unit length 1.

The line d represents the binary signals which are emitted from the converter C1 when the MFM recording method is used. Each binary character 1 is assigned a change in the amplitude of the binary signals and an additional change is inserted between two consecutive binary characters 0. Here again, the representation of one binary character requires one element duration $a$ and therefore results in a storage density of one bit per unit length 1.

Figure 3:
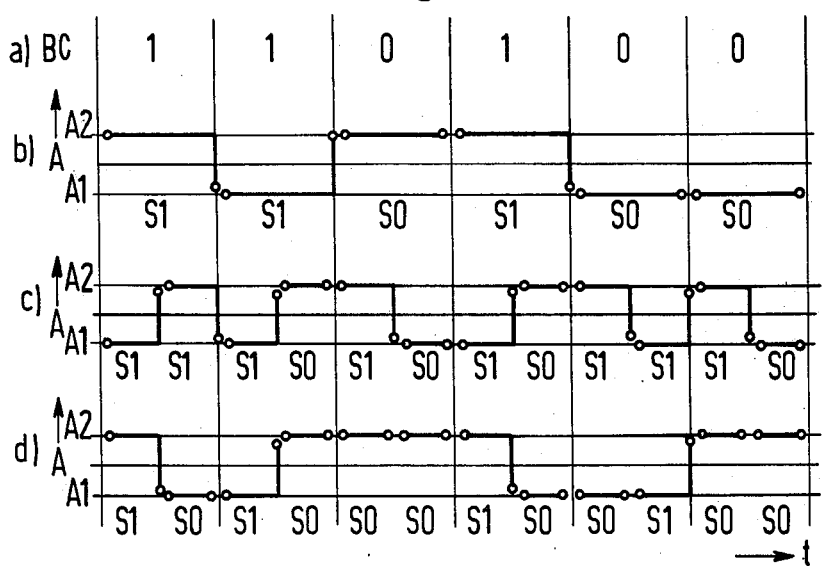
FIG. 3 illustrates the signals by individual signal elements.

FIG. 3 illustrates the binary signals represented in FIG. 2, having been broken down into individual signal elements SE having boundaries which are marked by dots. Further details of FIG. 3 will be described together with the assignment schedule, represented in FIG. 4, between the designations of the signal elements SE and their course in relation to time.

Figure 4:
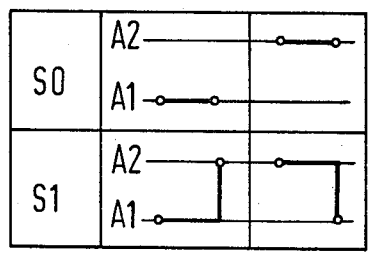
FIG. 4 illustrates the signal elements.

In the assignment schedule represented in FIG. 4, a constant course of a binary signal in relation to time within one time unit is assigned a signal element S0. A first signal element S0 is obtained if the signal has a first amplitude value A1 during the time unit, and a second signal element S0 is obtained if the binary signal has a second amplitude value A2 during the time unit. A first and second signal element S1 is assigned to a change in the course of the binary signal from the first amplitude value A1 to the second amplitude value A2 or from the second amplitude value A2 to the first amplitude value A1 within the time unit.

When the binary signals are broken down into individual signal elements SE or when the binary signals are composed from these signal elements SE, it is necessary to use those of the signal elements S0 or S1 which ensure a continuous course of the binary signals. In each case in FIG. 3 under the binary signals represented it is stated which signal element SE has been used.

In the following Tables I to III, the assignments between the binary characters BC and the signal elements SE are represented in the form of assignment schedules for the binary signals illustrated in FIGS. 2 and 3.

TABLE I

| BC | SE |
|---|---|
| 1 | S1 |
| 0 | S0 |

In the assignment list for the NRZ (M) recording method illustrated in Table I, each binary character 0 is assigned a signal element S0 and each binary character 1 is assigned a signal element S1.

TABLE II

| BC | SE | Conditions |
|---|---|---|
| 1 | S1 S1 | When "1" follows |
|   | S1 S0 | When "0" follows |
| 0 | S1 S0 | When "1" follows |
|   | S1 S1 | When "0" follows |

The assignment list for the phase modulation method represented in Table II illustrates that in dependence upon whether it is followed by a binary character 1 or a binary character 0, the binary character 1 is assigned a sequence of the signal elements S1 and S1 or S1 and S0. In dependence upon whether a binary character 1 or a binary character 0 follows, the binary character 0 is assigned a sequence of the signal elements S1 and S1, or of S1 and S0. In this recording method, the signal elements SE assigned to the binary characters BC are therefore always dependent upon the particular following binary characters BC.

TABLE III

| BC | SE | Conditions |
|---|---|---|
| 1 | S1 S0 |   |
| 0 | S0 S0 | When "1" follows |
|   | S0 S1 | When "0" follows |

The assignment schedule for the MFM recording method, represented in Table III illustrates that each binary character 1 is assigned the sequence of the signal elements S1 and S0. In dependence upon whether a binary character 1 or a binary character 0 follows, the binary character 0 is assigned the sequence of the signal elements S0 and S0 or that of the signal elements S0 and S1. Therefore, in this recording method, only the signal elements assigned to the relevant binary characters 0 are dependent upon the particular following binary characters.

From FIGS. 2 and 3 it can be seen that different intervals between the amplitude changes of the signals occur in the various recording methods. The intervals are stated in numerals. In the case of the NRZ (M) method, 1 is the smallest interval numeral when two binary characters 1 and therefore also two signal elements S1 follow one another. The largest occurring interval numeral is produced from the interval between the binary characters 1 and amounts of $n + 1$ with $n$ binary characters 0 between two binary characters 1. The possible interval ratios are therefore $1:2:3 \ldots n + 1$ in the NRZ (M) recording method.

In the case of the phase modulation recording method, only the interval ratios 1:2 occur as the signal elements assigned to the binary characters always contains at least one signal element S1. In the case of a MFM recording method, the interval ratios 2:3:4 occur, as due to the dependence of the signal elements assigned to the binary characters 0 upon the particular following binary characters, it is ensured that in each case four consecutive signal elements contain at least one signal element S1.

Beginning with the described assignment between the binary characters BC and the signal elements SE it is possible to produce a plurality of data recording or transmission processes. These processes can be selected, for example, on the principles of good pulsing of the signals and/or as large as possible a storage density.

TABLE IV

| BC | | | SE | | | |
|---|---|---|---|---|---|---|
| 0 | 0 | 0 | S0 | S1 | S1 | S1 |
| 0 | 0 | 1 | S1 | S0 | S1 | S1 |
| 0 | 1 | 0 | S0 | S1 | S0 | S1 |
| 0 | 1 | 1 | S0 | S1 | S1 | S0 |
| 1 | 0 | 0 | S1 | S0 | S0 | S1 |
| 1 | 0 | 1 | S1 | S0 | S1 | S0 |
| 1 | 1 | 0 | S1 | S1 | S0 | S1 |
| 1 | 1 | 1 | S1 | S1 | S1 | S0 |

Table IV is an assignment schedule for a new recording method in which, in this case, three binary characters BZ are assigned to a sequence of four signal elements SE. In the recording process, only interval ratios of numbers 1:2:3 occur and the pulsing of the signals in data receivers therefore becomes very simple. A storage density of 0.75 bits per unit length $l$ is attained with this recording method.

The interval ratio of 1:2:3 is achieved in that, of the 16 possible combinations of the four signal elements S0 and S1, only those are used which contain within themselves a maximum of two consecutive signal elements S0, and which also possess a maximum of two consecutive signal elements S0 in an arbitrary sequence. Of the 16 possible combinations, in this way nine are suitable for the representation of the binary characters. Only eight of these combinations are used, and these are assigned to the eight possible combinations of three binary characters. In the assignment schedule represented in Table IV, for example, the combination of the signal elements S1 S1 S1 S1 has been dispensed with. If tis combination will likewise be utilized, the storage density in this recording method would be further increased.

Figure 5:
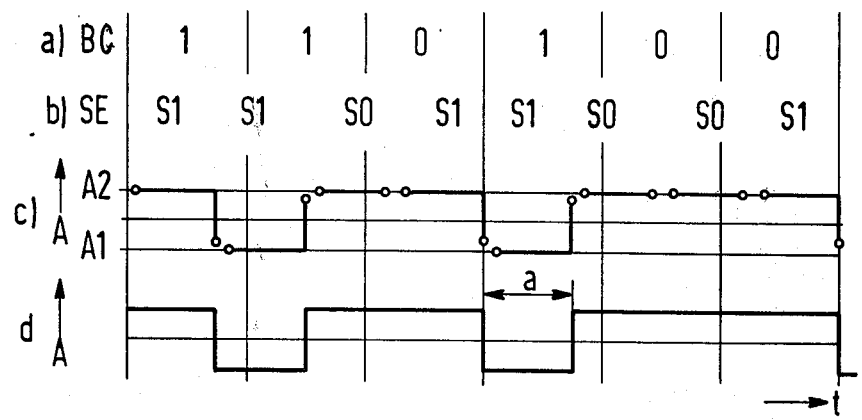
FIG. 5 is a timing diagram of signals determined by a new recording process.

In FIG. 5, line $a$ illustrates the sequence in binary characters BC and line $b$ illustrates the sequence of signal elements SE taken from the assignment schedule of Table IV. The line $c$ represents the signal courses assigned to the signal elements, and the line $b$ illustrates the course of the binary signals such as emitted from the converter C1 to the output of the data transmitter DT when this recording method is employed.

In the data receiver DR, the binary signals are pulsed, for example, by an oscillator which is adjusted by the binary signals in terms of phase and frequency, and the signal elements SE contained in the binary signals are established. In the converter C2, the signal elements SE are again assigned to the binary characters BC as illustrated in the assignment schedule represented in Table IV, and the transmitted items of data are emitted from the converter C2 to the output of the data receiver DR.

By introducing conditions into the assignment of the binary characters to the signal elements, similarly as in the assignment schedules illustrated in Tables II and III, it is possible to produce further recording methods which have improvements in comparison to recording methods having no conditions, in terms of the desired properties, in particular the pulsing.

As stated above, the known recording methods having a maximum storage density of one bit relative the unit length $l$ assigned to the element duration $a$. This storage density can also be very simply determined with the aid of the signal elements SE. A binary signal having the element duration $a$ is, in each case, composed from a number $vk$ of signal elements. In accordance with the assignment schedule, a number $s$ of signal elements SE is assigned a number of $b$ binary characters BZ, and the storage density D can therefore be determined from the equation $$D = vk \ (b/s).$$

For example when the NRZ (M) recording method, $s = 1$ signal elements are required for $b = 1$ binary characters and the minimum interval $vk$ is 1. Therefore, a storage density of one bit per unit length $l$ is obtained from the equation. In the same way, the storage density of the phase modulation recording method is calculated to be 0.5 and the MFM recording method is calculated to be one bit per unit length $l$.

As the representation of $d$ binary characters requires at least $s$ signal elements, the storage density is increased by virtue of an increase in the smallest interval numeral $vk$.

TABLE V

| BC | | | SE | | | | | | |
|---|---|---|---|---|---|---|---|---|---|
| 0 | 0 | 0 | S0 | S0 | S1 | S0 | S0 | S0 | S0 |
| 0 | 0 | 1 | S0 | S0 | S0 | S1 | S0 | S0 | S0 |
| 0 | 1 | 0 | S0 | S0 | S0 | S0 | S1 | S0 | S0 |
| 0 | 1 | 1 | S0 | S0 | S0 | S0 | S0 | S1 | S0 |
| 1 | 0 | 0 | S0 | S0 | S0 | S0 | S0 | S0 | S1 |
| 1 | 0 | 1 | S0 | S0 | S1 | S0 | S0 | S1 | S0 |
| 1 | 1 | 0 | S0 | S0 | S1 | S0 | S0 | S0 | S1 |
| 1 | 1 | 1 | S0 | S0 | S0 | S1 | S0 | S0 | S1 |

Table V illustrates an assignment schedule for a recording method in which, in each case, one group of $b = 3$ binary characters BC is assigned a group of $s = 7$ signal elements SE. When the groups of signal elements were selected from the $2^7$ possible combinations of seven signal elements S0 and S1, it was ensured that always at least two signal elements S0 occur between two signal elements S1. Of the nine combinations determined in this manner, only eight are assigned to the $2^3$ combinations of three binary characters BC. In order to achieve good pulsing of the signals in the data receiver DR, the combination of signal elements containing only signal elements S0 was not used.

Figure 6:
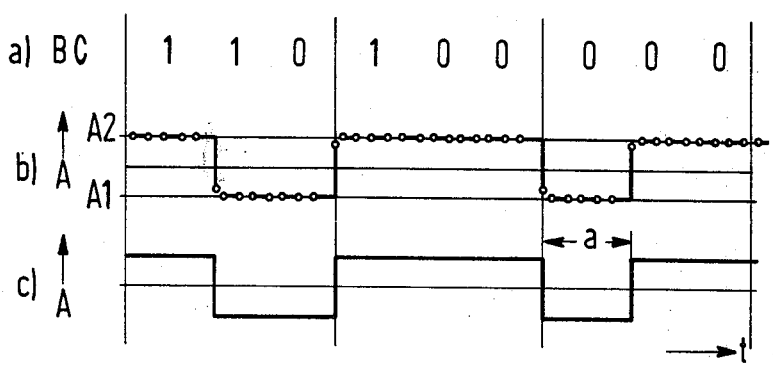
FIG. 6 is a timing diagram of signals established by a new recording process having a high storage density.

In FIG. 6, line a shows a sequence of binary characters BC and the line $b$ shows the signal courses of the signal elements assigned to the binary characters, as illustrated in Table V. For reasons of simplicity and clarity, the signal elements have not been referenced. The line $c$ shows the course of the binary signals emitted in the data transmitter DT. As a binary signal with the element duration $a$ consists of $vk = 3$ single elements, in this method of recording, by the above equation, there is a storage density of $D = 3 \ (3/7) = 1.28$ bits per unit length $l$.

Therefore in this method of recording, the storage density is 28% above the storage density of the known recording methods. If, in accordance with the NRZ (M) method, the combination of signal elements consisting only of signal elements S0 is also permitted, the storage density is further increased.

By increasing the number of signal elements SE assigned to the binary characters BC it is possible to further increase the storage density. For example, when $b = 4$ binary characters BC are assigned to $s = 18$ signal elements SE, a storage density of over 1.75 bits per unit length $l$ is achieved. Therefore, this storage density is already more than 75% higher than in known recording methods.

In determining a suitable recording method, it is necessary to establish the number $vk$ of signal elements of a signal with the element duration $a$ and the number $d$ of signal elements which indicate the smallest difference in the intervals between the signal elements S1. The values $vk$ and $d$ are established in that, in each case, a sufficient number of signal elements are used for $vk$ and $d$ to be whole numbers. Then, the groups of binary characters are assigned to groups of signal elements in which the established values for $vk$ and $d$ are adhered to and the groups are assigned to one another.

If necessary, in the determination of the groups of signal elements, it is also possible to ensure that the maximum occurring intervals between signal elements S1 do not contain more than $vg$ signal elements. In this case, a maximum of $vg - 1$ signal elements S0 occur between two signal elements S1 and, therefore, good pulsing of the transmitted signals is achieved. If insufficient suitable groups of signal elements are available, then, as shown in the following, certain of the non-selected groups can be additionally employed, if their occurrence is made dependent upon the preceding or following groups.

Figure 7:
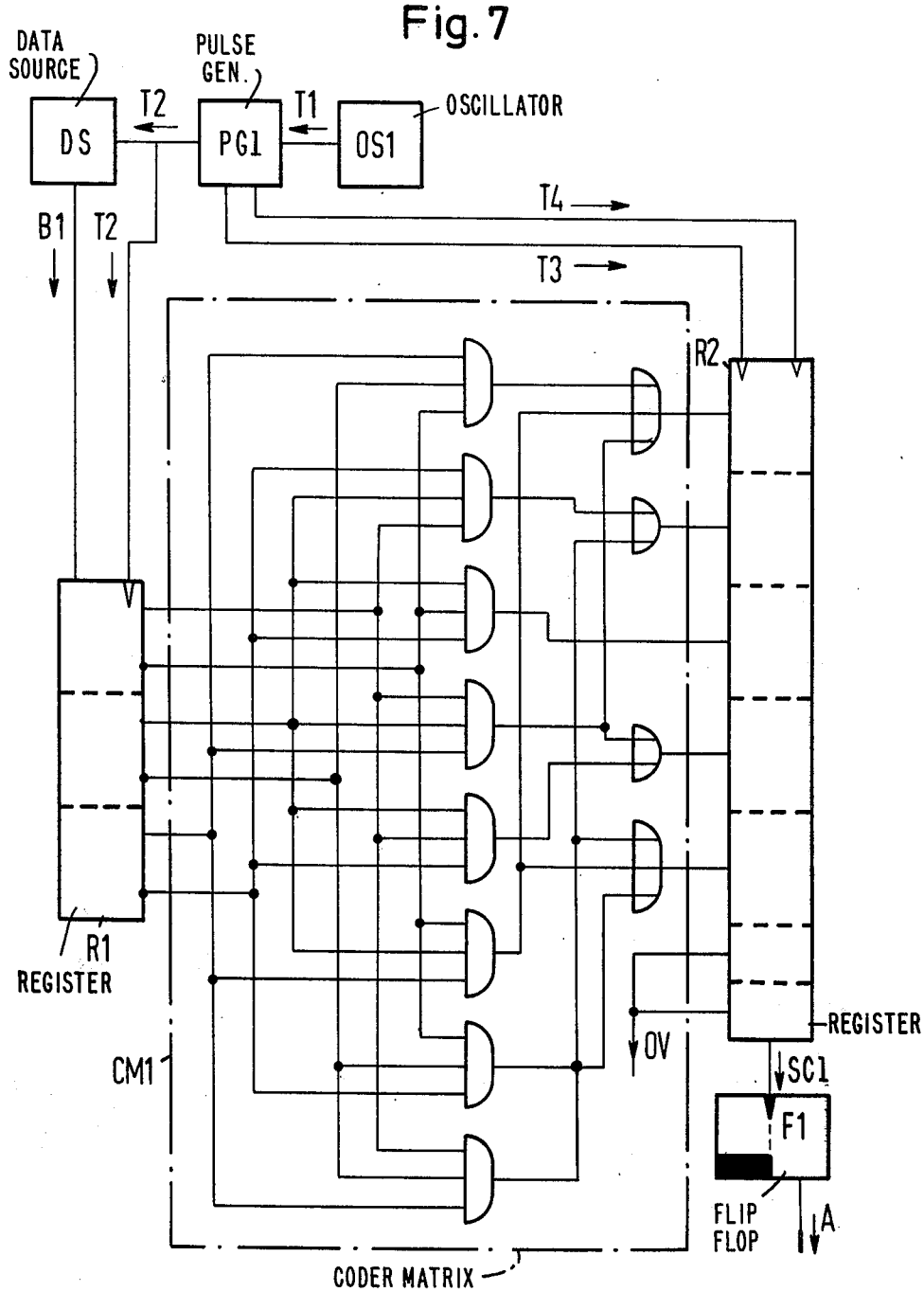
FIG. 7 is a schematic circuit diagram of a converter provided in the data transmitter for the new recording process having a high storage density.

FIG. 7 illustrates an exemplary embodiment of the converter C1 in the data transmitter DT, which assigns groups of binary characters to the groups of signal elements in accordance with the assignment schedule in Table V. The converter C1 contains an oscillator OS1, a pulse generator PG1, two registers R1 and R2 designed as shift registers, a flip-flop F1 and a plurality of binary logic linking elements which form a coder matrix CM1.

The oscillator OS1 of constant repetition frequency feeds the pulse generator PG1 with rectangular pulses T1. The repetition frequency determines the shortest occurring element duration $a$ of the signals A at the output of the data transmitter DS. With the aid of the pulses T1, the pulse generator PG1 produces further pulses T2, T3 and T4 which are fed to the register R1, to the data source DS, and to the register R2.

In each case, three pulses T2 input three binary characters represented in the form of a data signal B1 emitted from the data source DS in serial fashion into the register R1. After write-in, the binary character illustrated in the right-hand column of Table V is contained in the uppermost portion of the register R1. With the aid of the coder matrix CM1 connected between the registers R1 and R2, the groups of binary characters BC are assigned to the groups of signal elements SE in accordance with Table V.

After each write-in process, the pulse generator PG1 emits a pulse T3 to the register R2 which transfers the binary values which are assigned to the signal elements SE and which are present at the outputs of the coder matrix CM1 into the register R2 in parallel.

As only signal elements S0 occur in the first two columns for the signal elements in Table V, a reference potential of 0V assigned to a binary value 0 is connected to the inputs of the lowest positions of the register R2 which are assigned to these columns.

When the transfer has been completed, the pulse generator PG1 emits seven pulses T4 to the register R2 and the stored binary values are read out in serial fashion. At the output of the register R2 a signal SC1 appears which assumes the binary values 0 and 1 whenever the binary values assigned to the signal elements 0 and 1 occur. In order to produce a binary signal A which corresponds to the binary signal A represented in FIG. 6, the signal SC1 is fed to the pulse train input of the flip-flop F1 and the flip-flop F1 is triggered whenever the signal SC1 changes its binary value from 1 to 0.

Additional details of the converter C1 will be described together with the circuit diagram of the pulse generator PG1 illustrated in FIG. 8 and with the timing diagram represented in FIG. 9.

Figure 8:
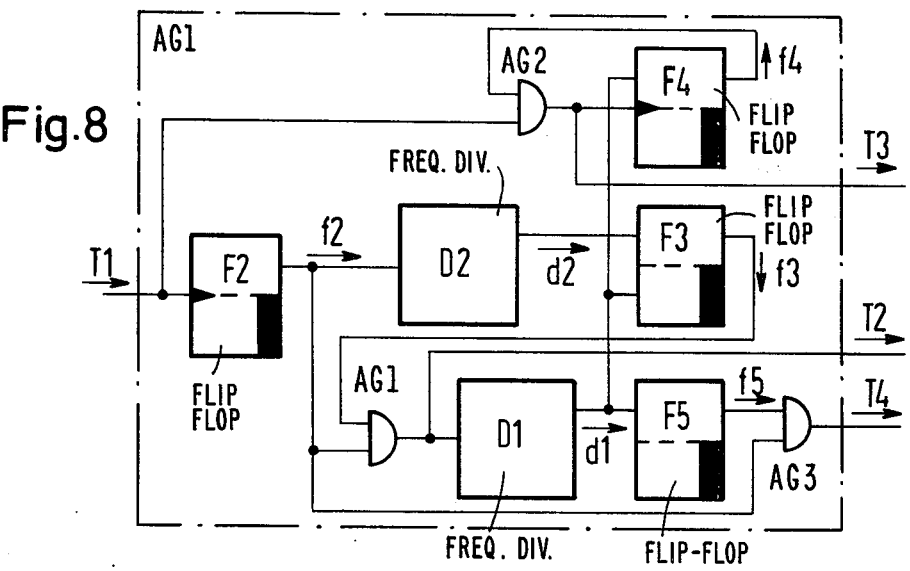
FIG. 8 is a schematic circuit diagram of a pulse generator in the converter.

The pulse generator PG1 illustrated in FIG. 8 comprises two frequency dividers D1 and D2, four flip-flops F2–F5, and three AND gates AG1–AG3. The pulse generator PG1 is supplied with the pulses T1 produced by the oscillator OS1, and emits the pulses T2–T4.

Figure 9:
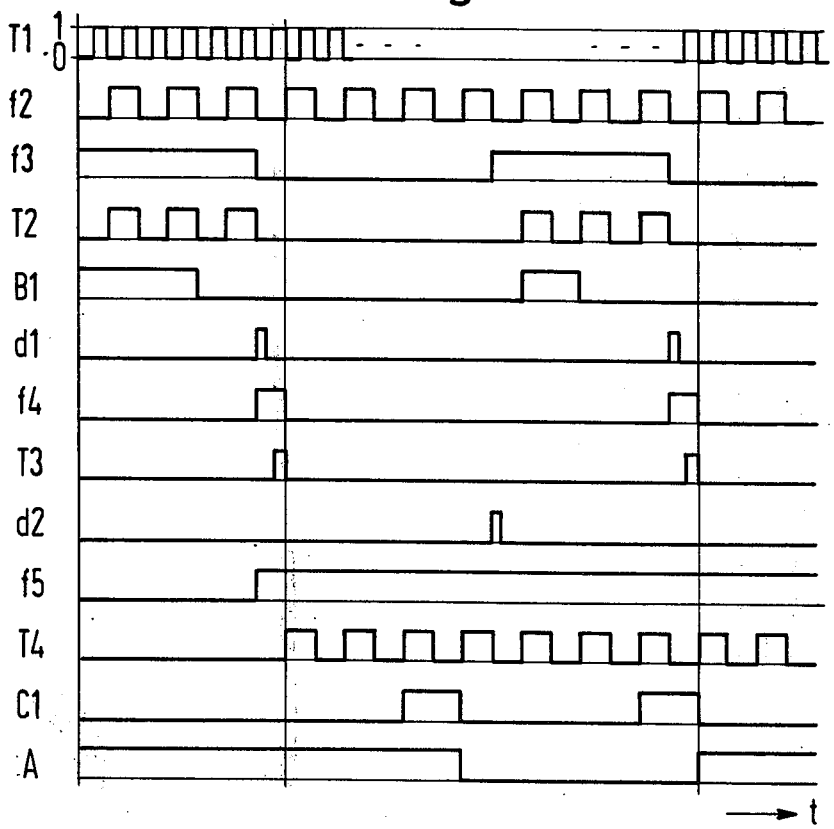
FIG. 9 is a timing diagram of signals at various points of the converter in the data transmitter.

FIG. 9 is a timing diagram of signals as occur in the operation of the converter C1 represented in FIG. 7 and the pulse generator PG1 illustrated in FIG. 8. The time $t$ is plotted along the abscissa direction and the amplitudes of the signals are plotted along the ordinate direction. Inasmuch as all of the signals are binary signals, they only assume binary values referenced 0 and 1.

At the beginning of the production of the binary signals A, the frequency dividers D1 and D2 and the flip-flops F2, F4 and F5 are reset, and the flip-flops F1 and F3 are set. After the release of the converter C1, each pulse T1 triggers the flip-flop F2. The signal $f2$ at its output is fed to the AND gates AG1 and AG3. As the flip-flop F3 is set, the signal $f3$ at its output releases the AND gate AG1. At the output of the AND gate AG1, the pulses T2 are emitted to the register R1. The pulses input the binary characters simultaneously emitted from the data source DS in the form of the data signal B1 into the register R1.

The pulses T2 are also fed to the frequency divider D1 which, in each case after three pulses T2, emits a signal $d1$. The frequency divider D1 comprises, for example, a dual counter having outputs which are connected to the first inputs of a comparator. The second inputs of the comparator are supplied with the number 3 as a dual number. As soon as the dual counter has emitted three pulses, the comparator emits the signal $d1$ and resets the counter again. The signal $d1$ also sets the flip-flops F4 and F5 and resets the flip-flop F3. Following the resetting of the flip-flop F3, the AND gate AG1 is blocked and no more pulses T2 are emitted. After the three pulses T2, the first group of binary characters is completely stored in the register R1. The coder matrix CM1 produces the signal elements assigned to the binary characters and emits signals having corresponding binary values to the inputs of the register R2.

The flip-flop F4 controls the production of the pulses T3. The flip-flop F4 releases the AND gate AG2 with the aid of a signal $f4$ at its output, and the pulses T1 are conducted to the AND gate AG2. At the output of the AND gate AG2, the pulse T3 is emitted, the duration of such pulse being equal to the duration of a pulse T1. The pulse T3 inputs the binary values present at the inputs of the register R2, in parallel form, into the register R2. The pulse T3 also resets the flip-flop F4 again with its trailing edge.

After the setting of the flip-flop F5, the signal f5 at its output releases the AND gate AG3 and pulses T4 are emitted to the register R2. The pulses T4 produce a serial read out of the register R2 and at the output thereof the signals SC1 appear which change in binary values in accordance with the stored binary values. If, for example, the binary characters 110 have been written into the register R1, in accordance with FIG. 6, with the aid of the pulses T2, the signal SC1 successively assumes the binary values 0010001.

The signal SC1 is fed to the pulse train input of the flip-flop F1 and the binary signals A at its output change their binary values whenever the signals SC1 change their binary values from 1 to 0. The part of the binary signals A represented in FIG. 9 is identical to the binary signals A represented in the first half of FIG. 6, line c. It is amplified in the data transmitter DT and emitted to the transmission channel TC.

The frequency divider D2 is of similar construction to the frequency divider D1 and after, in each case, seven pulses it emits a signal D2. The frequency divider D2 counts the pulses $f2$ emitted from the flip-flop F2 and, after seven pulses, sets the flip-flop F3 again with the aid of the signals $d2$. The signal $f3$ releases the AND gate AG1 again and again three pulses T2 are emitted which input the next group of three binary characters emitted from the data source DS into the register R1. After encoding by the coder matrix CM1, a pulse T3 is again produced, etc.

Figure 10:
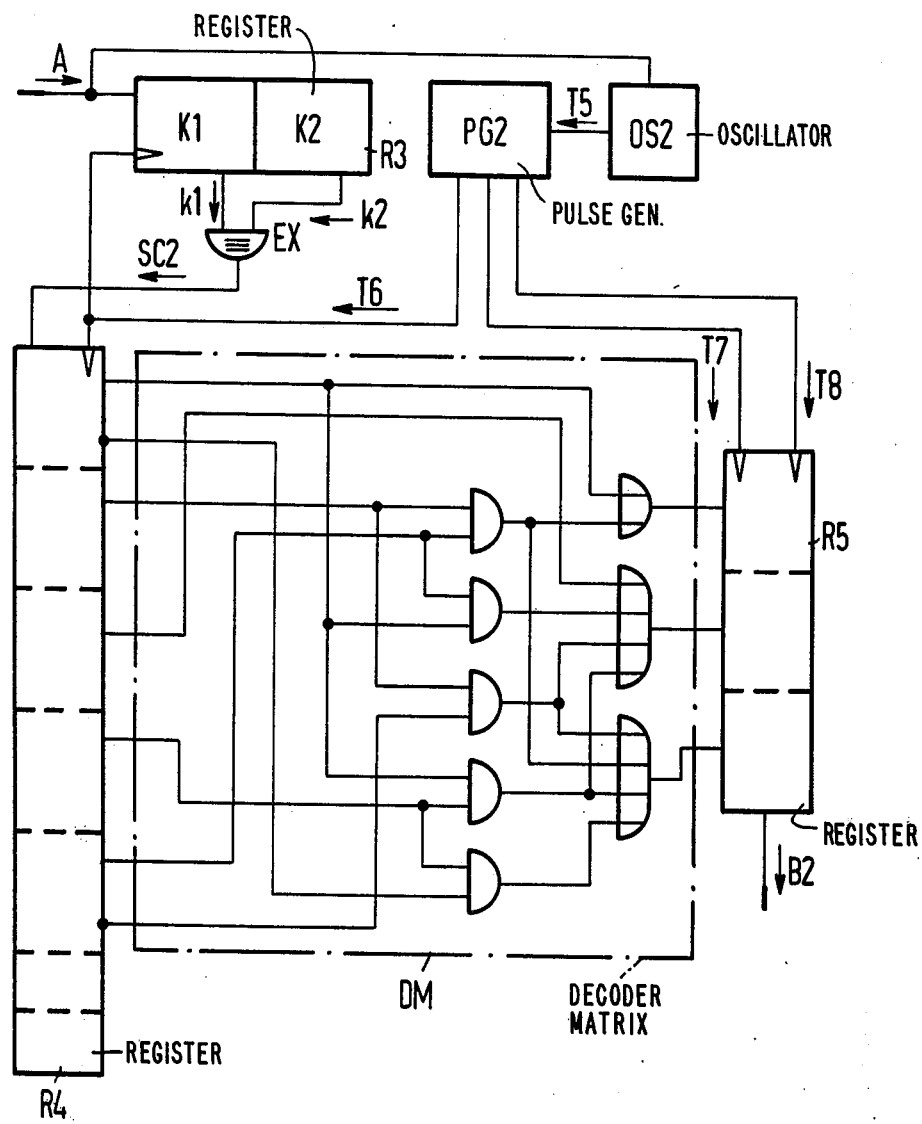
FIG. 10 is a schematic circuit diagram of a converter in the data receiver.

FIG. 10 illustrates an exemplary embodiment of a converter C2 in the data receiver DE which regains the transmitted binary characters from the binary signals A. The converter C2 comprises an oscillator OS2, a pulse generator PG2, three registers R3-R5 designed as shift registers, an anit-valence element EX and a plurality of binary logic linking elements which form a decoder matrix DM. The oscillator OS2 is synchronized by the received signals A and emits rectangular pulses T5 to the pulse generator PG2. The repetition frequency of the pulses T5 is identical to that of the pulses T1 of the oscillator OS1. With the aid of the pulse T5, the pulse generator PG2 produces further pulses T6, T7 and T8 which correspond to the pulses T4, T3 and T2, which are fed to the registers R3-R5. The pulse generator PG2 is of similar construction to the pulse generator PG1, the only difference being that the flip-flop F3 is reset at the beginning of the transmission, that the setting input of the flip-flop F4 supplied with a signal $d2$ instead of the signal $d1$, and that the flip-flop F5 and the AND gate AG3 are not necessary.

The pulse T6 inputs the binary values assigned to the binary signals A, in serial fashion, into the register R3. The signals $k1$ and $k2$ emitted at the outputs of the stages K1 and K2 of the register R3 are fed to an anti-valence element EX which, from the binary signals A, produces signals SC2 which correspond to the signal SC1 in the converter C1. The pulse T6 then inputs the binary values assigned to the signal SC2 into the register R4, in serial form. The two lowest stages of the register R4 are not required as, in accordance with Table V, these stages contain only binary values 0. After seven pulses T6 the binary values assigned to the first group of signal elements are stored in the register R4. Then, the signal elements are again assigned to binary characters by the decoder matrix DM and a pulse T7 inputs the binary values assigned to the binary characters into the register R5, in parallel form. Subsequently, three pulses T8 are emitted and the stored binary values are emitted in serial form as signals B2 at the output of the register R5. Simultaneously, with the emission of the pulses T8, the binary values assigned to the next group of signal elements are already being input into the registers R3 and R4, etc.

TABLE VI

| BC | SE | Conditions |
|---|---|---|
| 00 | S0 S0 S0 S0 S0 S0 S0 S0 | When 00 does not precede |
|    | S1 S0 S0 S0 S0 S0 S1 S0 | When 00 precedes |
| 01 | S0 S0 S0 S0 S0 S1 S0 S0 | |
| 10 | S0 S0 S0 S0 S0 S0 S1 S0 | |
| 11 | S0 S0 S0 S0 S0 S0 S0 S1 | |

Table IV illustrates an assignment schedule for a further recording method in which one group of $b = 2$ binary characters BC is, in each case, assigned to a group of $s = 8$ signal elements SE. In the selection of the groups of signal elements from the $2^8$ possible combinations of the eight signal elements S0 and S1, it was ensured that at least five signal elements S0 always occur between two signal elements S1. Also, an additional group of signal elements represented in the second row was selected which, in each case, contains a signal element S1 in the first and the seventh positions.

If the received signals can be pulsed in the data receiver DR in accordance with the NRZ (M) recording method, even when only signal elements S0 occur in several consecutive groups of signal elements, the use of the additional group represented in the second row is dispensed with. In such a recording method, there is then a storage density of $D = 6 (2/8) = 1.5$ bits per unit length $l$. If, however, it must be ensured that a signal element S1 occurs at least in each second group of signal elements, only the lower three groups of signal elements can be used. However, these three groups can only be assigned a binary character BC and, in this case, there is a storage density of $D = 6 (⅛) ) = 0.75$ bits per unit length $l$.

In this case, it would be possible to increase the storage density, if the three combinations were assigned the three ternary characters 0, 1, 2 of a ternary number system. In this case, there would be a storage density of $D = 6 (1d⅜) = 1.19$ bits per unit length $l$.

If, however, in the use of binary characters, it must be ensured that a signal element S1 occurs at least in each second group of signal elements, the storage density can be increased in comparison to the above-mentioned value of 0.75 bits per unit length $l$, in that the group of binary characters 00 is optionally assigned the group of signal elements SE contained in the first or second row. The assignment is made in dependence upon whether a group of binary characters 00 precedes or not. If the group of binary characters 00 is not preceded by a group of binary characters 00, the group contained in the first row is used and otherwise the group contained in the second row. In this way, good pulsing of the signals is ensured, as it is ensured that at least in each second group of signal elements there occurs a signal element S1 which corresponds to a change in the binary signal.

Figure 11:
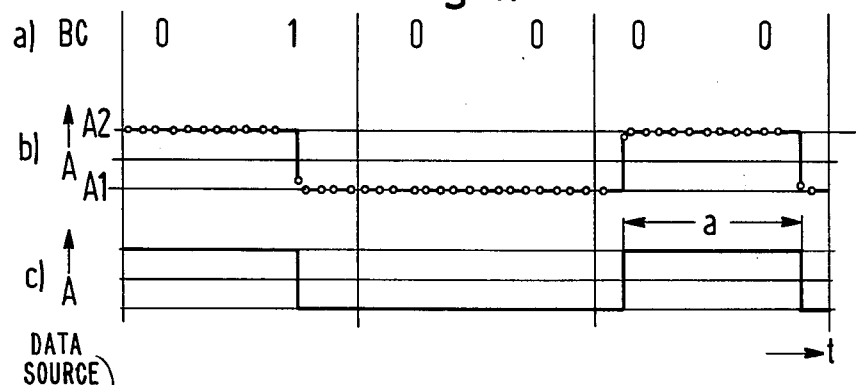
FIG. 11 is a timing diagram of signals produced in accordance with another new recording process having a high storage density.

In line a of FIG. 11, a sequence of binary characters BZ is illustrated and in line b the signal courses of the signal elements assigned to the binary characters in accordance with Table VI is illustrated. For reasons of clarity, the signal elements have not been designated. The line c shows the course of the binary signals emitted at the data transmitter DT. In FIG. 11, the first group of binary characters 00 has been assigned the group of signal elements contained in the first row of Table VI, and the second group of binary characters has been assigned the group of signal elements contained in the second row.

As the binary signals having the signal duration $a$ contain $vk = 6$ signal elements, with this recording method there is a storage density of $D = 6 (2/8) = 1.5$ bits per unit length $l$. Therefore, when this recording method is used the storage density is 50% above the storage densities of known recording methods.

Figure 12:
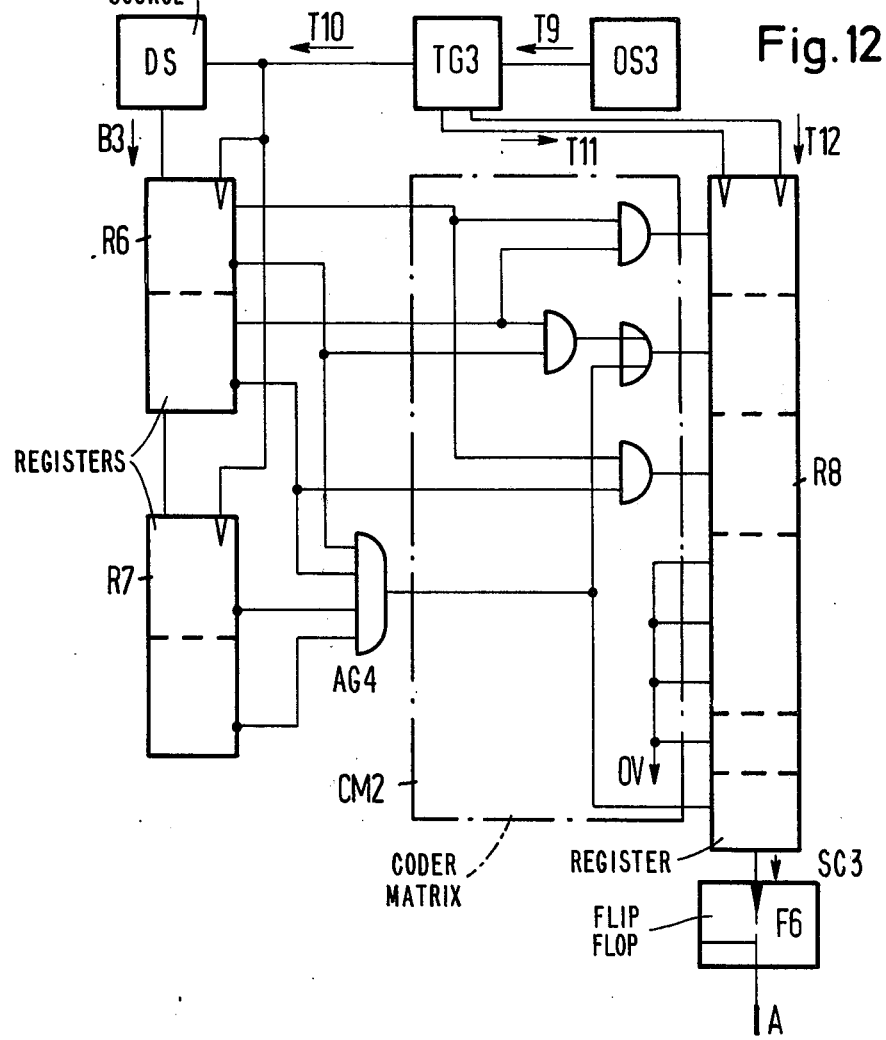
FIG. 12 is a schematic circuit diagram of a converter provided in the data transmitter for the other new recording process having a high storage density.

FIG. 12 illustrates another exemplary embodiment of the converter C1 which, in accordance with the assignment schedule illustrated in Table VI, assigns the binary characters BC to the signal elements SE, taking into account the given conditions.

The converter C1 contains an oscillator OS3, a pulse generator PG3, three registers R6-R8 designed as shift registers, a flip-flop F6, a switching stage comprising an AND gate AG4, and a coder matrix CM2 comprising binary logic linking elements. The oscillator OS3 corresponds to the oscillator OS1 and emits pulses T9 of constant repetition frequency to the pulse generator PG3. The pulse generator PG3 is of similar construction to the pulse generator PG1 and emits pulses T10, T11 and T12 which correspond to the pulses T2, T3 and T4. It only differs from the pulse generator PG1 in that the frequency dividers D1 and D2 emit a signal $d1$, $d2$ not after, in each case, three and seven pulses, but after two and eight pulses.

The pulses T10 are fed to the register R6, and after two pulses, the first group of binary characters is input, in serial fashion, into the register R6. It will be assumed that at the beginning of the conversion the registers R6 and R7 contain only binary values 1. The coder matrix CM2 assigns the group of binary characters BZ a group of signal elements SE and the binary values at the inputs of the register R8 are input, in parallel form, into the register R8 with the aid of a pulse T11. Then, eight pulses T12 are produced and the content of the register R8 is read out in serial fashion. The binary values of the signal SC3 at the output of the register R8 correspond to the signal elements SE. The signal SC3 is fed to the flip-flop F6 in accordance with the signal SC1 in FIG. 7 and, at its output, the binary signals A are emitted which correspond to the binary signals A in FIG. 11.

After two further pulses T10, the first group of binary characters is input, in serial fashion, into the register R7. At the same time, a second group of binary characters is input into the register R6. The AND gate AG4 checks whether groups of binary characters containing only the binary characters 00 are stored both in the register R6 and in the register R7. If this is not the case, an assignment is carried out in accordance with the first, third and fourth and fifth rows of Table VI. If, however, both registers R6 and R7 contain only the binary characters 0, a signal with the binary value 1 is emitted at the output of the AND gate AG4, and an assignment is made in accordance with the second to fifth rows of Table VI. Then, the binary values of the signals at the outputs of the coder matrix CM2 are again transferred, in parallel fashion, into the register R8 with the aid of a pulse T11.

A converter C2, associated with the converter C1, in the data receiver DR is of similar construction to the converter C2 represented in FIG. 10 and does not require any other shift register for the intermediate storage of the signal elements, as the assignment of signal elements to the binary characters is carried out without conditions.

By introducing further conditions, for example in accordance with the conditions prevailing in the production of the NRZ (M) recording method, or the MFM recording method shown in Tables II and III, it is possible to produce a plurality of new recording methods. It is therefore possible to match, in particular, the recording density and the pulsing capability to the particular requirements imposed, in the best manner possible.

Although we have described our invention by reference to particular illustrative embodiments thereof, many changes and modifications of the invention may become apparent to those skilled in the art without departing from the spirit and scope of the invention. We therefore intend to include within the patent warranted hereon, all such changes and modifications as may reasonably and properly be included within the scope of our contribution to the art.

We claim:

1. A process for representing digital data by binary signals, in which the data are in the form of binary, ternary or higher value coded characters, in which the characters are fed in the form of data signals to a transmitter which assigns binary signals to the characters, and in which the binary signals are transmitted over a transmission channel to a data receiver which regains the digital data from the binary signals, comprising the steps of:

assigning at least one combination of signal elements to each of the possible combinations of a given number of characters which form a group of characters;

each signal element combination formed by assigning first signal elements to represent a first or a second amplitude value and assigning second signal elements to represent a change in the amplitude value;

the last-mentioned assignments of signal elements including the step of providing, in each arbitrary sequence of the groups of signal elements, at least a plurality of the first signal elements between two second signal elements;

dividing the characters fed to the transmitter into groups of the given number; and representing the groups of characters, in accordance with the assignment by the groups of signal elements.

2. The process of claim 1, wherein the step of providing first signal elements between second signal elements is further defined as providing no more than a predetermined number of first signal elements between two second signal elements.

3. The process of claim 1, wherein the step of assigning of signal elements to a group of characters is defined as assigning signal elements to a group of characters independently of adjacent groups of characters.

4. The process of claim 1, wherein the step of assigning signal elements to a group of characters is defined as assigning the signal elements in dependence on adjacent groups of characters.

5. The process of claim 4, wherein the step of assigning is further defined as assigning the signal elements in dependence upon the preceding group of characters.

6. The process of claim 1, in which the transmission channel includes a store, and comprising the step of supplying the transmission channel with binary signals having amplitude values corresponding to the code states of the storage medium.

7. The process of claim 6, in which the store is a magnetic store having saturation magnetizations, and comprising the step of assigning the amplitude values to the magnetizations.

8. A circuit arrangement for representing data by binary signals in which the data are in the form of binary, -ternary-or higher-coded characters, comprising:

a transmission channel;

a transmitter for receiving the characters and assigning binary signals to the characters, said transmitter connected to said transmission channel to input the binary signals thereto;

said transmitter including a converter which receives the data signals and which comprises a first register for receiving a first group of characters, a coder matrix connected to the outputs of said first register to assign a group of binary signal elements to a group of characters, a second register which is a shift register connected to said coder matrix for receiving the binary encoded values assigned to a group of signal elements in parallel form, and a flip-flop connected to the output of said shift register to receive and output the binary values in serial form to said transmission channel; and a data receiver connected to said transmission channel for receiving, and regaining the data signals from, the binary signals.

9. The circuit arrangement of claim 8, wherein said first register is a shift register which is connected to receive the data signals in series and output the data signals to said coder matrix in parallel.

10. The circuit arrangement of claim 8, comprising:
a third register connected to receive a preceding set of data signals in series from said first register; and
a switching stage connected between the outputs of said first and third registers and said coder matrix and operable to control the assignment of signal elements by said coder matrix in accordance with the contents of said first and third registers.

* * * * *